(12) United States Patent
Gaudio et al.

(10) Patent No.: US 7,882,224 B2
(45) Date of Patent: Feb. 1, 2011

(54) METHOD AND SYSTEM FOR AUTOMATIC NETWORK CONNECTION ESTABLISHMENT IN CASE OF NETWORK ADDRESS RENEWAL

(75) Inventors: Luigi Gaudio, Rome (IT); Andrea Naglieri, Rome (IT); Jacopo T. Santaiti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 12/234,269

(22) Filed: Sep. 19, 2008

(65) Prior Publication Data

US 2010/0077071 A1    Mar. 25, 2010

(51) Int. Cl.
*G06F 15/173* (2006.01)
(52) U.S. Cl. .................. 709/224; 709/238; 370/216; 370/220; 714/4
(58) Field of Classification Search .................. 709/220, 709/206, 238, 224; 370/331, 221, 310, 352, 370/216, 220; 705/1; 455/432.1; 714/4
See application file for complete search history.

(56) References Cited

U.S. PATENT DOCUMENTS

| | | |
|---|---|---|
| 6,175,933 B1 | 1/2001 | Cadden |
| 6,963,923 B1 | 11/2005 | Bennett |
| 2003/0093505 A1 * | 5/2003 | Waldo et al. ................. 709/220 |
| 2005/0157703 A1 * | 7/2005 | Roh ............................ 370/352 |
| 2006/0155563 A1 * | 7/2006 | Banerjee et al. ................. 705/1 |
| 2006/0218296 A1 * | 9/2006 | Sumner ....................... 709/238 |
| 2007/0203990 A1 * | 8/2007 | Townsley et al. ............ 709/206 |
| 2007/0265000 A1 * | 11/2007 | Hanson et al. ........... 455/432.1 |
| 2007/0291670 A1 * | 12/2007 | Pettersson et al. ........... 370/310 |
| 2008/0130572 A1 * | 6/2008 | Zhang et al. ................. 370/331 |
| 2009/0210518 A1 * | 8/2009 | Verma et al. ................. 709/220 |
| 2009/0296567 A1 * | 12/2009 | Yasrebi et al. .............. 370/221 |

* cited by examiner

*Primary Examiner*—Jungwon Chang
(74) *Attorney, Agent, or Firm*—Jeffrey S. LaBaw; Myers Andras Sherman & Zarrabian LLP

(57) ABSTRACT

A method and system for maintaining a connection in a communication network is provided. One implementation involves activating a first network interface for obtaining a first network address for communication over the network; monitoring the network and determining a first lease time for the first network address; activating a second network interface for obtaining a second network address for communication over the network upon approaching end of the lease time, thereby maintaining communication over the network via the second network address; and deactivating the first network interface.

20 Claims, 3 Drawing Sheets

METHOD AND SYSTEM FOR AUTOMATIC NETWORK CONNECTION ESTABLISHMENT IN CASE OF NETWORK ADDRESS RENEWAL

BACKGROUND OF THE INVENTION

1. Field of the Invention

The present invention relates generally to networking and in particular to automatically renew established network connections.

2. Background Information

With the proliferation of networked computers, providing reliable connections has become important. An example is establishing a reliable connection among two or more computers that are assigned a dynamic Internet Protocol (IP) address in order to guarantee correct data exchange therebetween. A dynamic IP address is subject to a "lease time", which is a parameter that determines the time set by a Dynamic Host Configuration Protocol (DHCP) server to make use of that IP address. In almost all provider-based network services the lease time must be renewed (e.g., via a DHCPREQUEST in DHCP protocol). Typically, a computer with a dynamic address allows data exchange while the IP address and therefore the connection remains active. Due to traffic congestion, however, the DHCP server could unpredictably remove the leased address if it does not have a large amount of IP addresses to share among users (very frequent in case of small network providers). Furthermore, if a communication session with a computer is based on a connectionless protocol, then the computer has no knowledge of renewal of its IP address, resulting in loss of the communication session.

SUMMARY OF THE INVENTION

The invention provides a method and system for maintaining a connection in a communication network even when a network address provider renews the network address associated with a client requesting such address. One embodiment involves activating a first network interface for obtaining a first network address for communication over the network; monitoring the network and determining a first lease time for the first network address; activating a second network interface for obtaining a second network address for communication over the network upon approaching end of the lease time, thereby maintaining communication over the network via the second network address by using a daemon that switches over the second network interface and deactivating the first network interface.

Determining a lease time for said first network address may further include statistically computing the lease time for the first network address. The method may further include monitoring the network and determining a second lease time for said second network address; upon approaching the end of the second lease time for said second network address, activating the first network interface for obtaining another network address for communication over the network; and deactivating the second network interface.

Each network address may comprise an internet protocol (IP) address, wherein obtaining each network address may include obtaining an IP address from a DHCP server in the network. Obtaining a second network address may further include activating the second network interface adapter to acquire a second IP address via a DHCPREQUEST. Determining a first lease time for the first IP address may include statistically determining a minimum lease time for the common DHCP environment. Activating the second network interface for obtaining a second IP address may include acquiring a second IP address via a DHCPREQUEST before expiry of the calculated minimum lease time.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for automatically establishing a network connection in case of network address renewal. In one embodiment, the invention provides reliable data exchange among devices (e.g., computers, work stations, consumer electronics) in a network that communicate via a connectionless protocol and are subject to the renewal of their network address (e.g., IP address) in a dynamic addressing environment (e.g., Dynamic IP addressing). The invention is useful generally with intranet or internet networks that use a domain name system (DNS) to handle IP addresses of a host device requesting for a network connection, and in particular when an address provider has a relatively small set of dynamic addresses to share among clients.

One implementation involves maintaining a communication session for transfer of data between two devices, such as computers, that are assigned a dynamic IP address by a server, wherein at least one of the computers has two network adapters (network interfaces), said computer functioning as source of data for data transfer. A daemon (i.e., computer software or background process) on that computer activates a first network adapter of the computer for receiving an IP address from the network server, the first network adapter becoming the master. The IP address has a lease time associated with it. The daemon monitors the network and computes the lease time for the received IP address.

When the daemon detects that the end of lease time is close, upon which the IP address will be released, the daemon alerts a second network adapter of that computer to request a new IP address from the network, the second adapter becoming the master, the new IP address having a lease time associated with it. The daemon monitors the network and computes the lease time for the new IP address. When the daemon detects that the end of lease time is close, upon which the new IP address will be released, the daemon alerts the first network adapter to request a new IP address from the network, the first adapter becoming the master, the new IP address having a lease time associated with it. And, so on.

Figure 1:
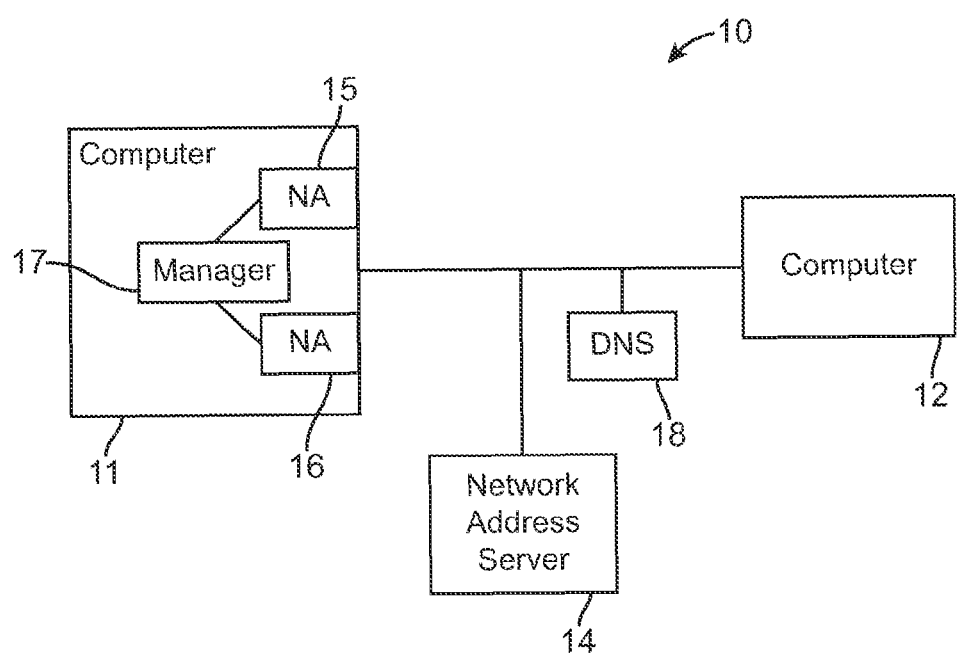
FIG. 1 shows a functional block diagram of a system for automatic network connection establishment in case of network address renewal, according to an embodiment of the invention.

The invention is useful in addressing data tunneling problems due to the loss of connection that may prevent complete data transfer. FIG. 1 shows an example architecture 10 for maintaining a communication session for transfer of data between two computers 11 and 12, wherein the computer 11 provides data to the computer 12 over a network. The computer 11 includes two network adapters 15 and 16 (the computer 12 includes one or more network adapters). A network address server (e.g., DHCP server) 14 provides network addresses to the computers.

A daemon (managing process) 17 monitors the network and determines a lease time for the current IP address obtained via the first network adapter 15. When the lease time of the IP address in use on the first network adapter is about to end, entering a "critical timeframe", then the daemon 17 activates the second network adapter 16 to acquire, via a DHCPREQUEST, its own IP address, known by the DHCP server. The hostname-IP Address pair is known by the DNS 18 and for this reason the tunneling between the two computers will continue without any loss of data. The first network adapter 15 is then deactivated. The connection between the two computers 11, 12 is maintained by switching between the two network adapters 15, 16, thereby maintaining the client computer 11 non-dependent by the end of the lease time.

Figure 2:
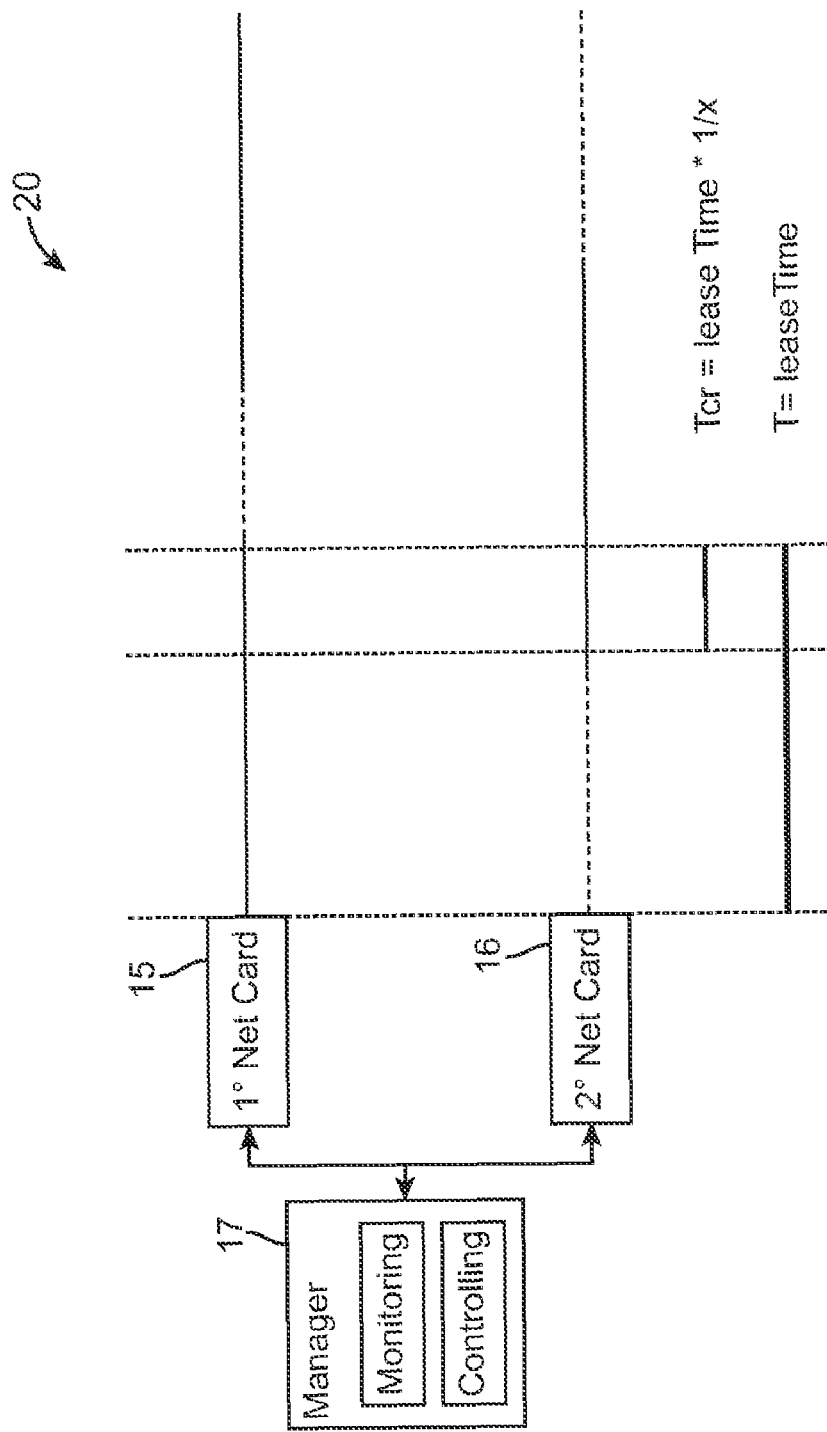
FIG. 2 shows a process timeline for automatic network connection establishment in case of network address renewal, according to an embodiment of the invention.

FIG. 2 shows a timing process 20 implemented by the daemon 17 that manages the two network adapters 15, 16, in the computer 11 (FIG. 1). The daemon 17 performs monitoring of the network and controls the network adapters based on the monitoring results, for maintaining communication over the network. Specifically, the daemon 17 keeps the network adapter 15 active (master) during the lease period T of the IP address for the network adapter 15, while the adapter 16 remains inactive (slave). Then, during a critical timeframe Tcr, the daemon 17 activates the network adapter 16 (master) to obtain an IP address. After the time period Tcr, the daemon 17 deactivates the network adapter 15 (slave). The daemon 17 keeps the network adapter 16 active during a lease period T of the IP address for the network adapter 16. Then during a critical timeframe Tcr, the daemon 17 activates the network adapter 15 to obtain an IP address. After the time period Tcr, the daemon 17 deactivates the network adapter 16. And, so on.

Figure 3:
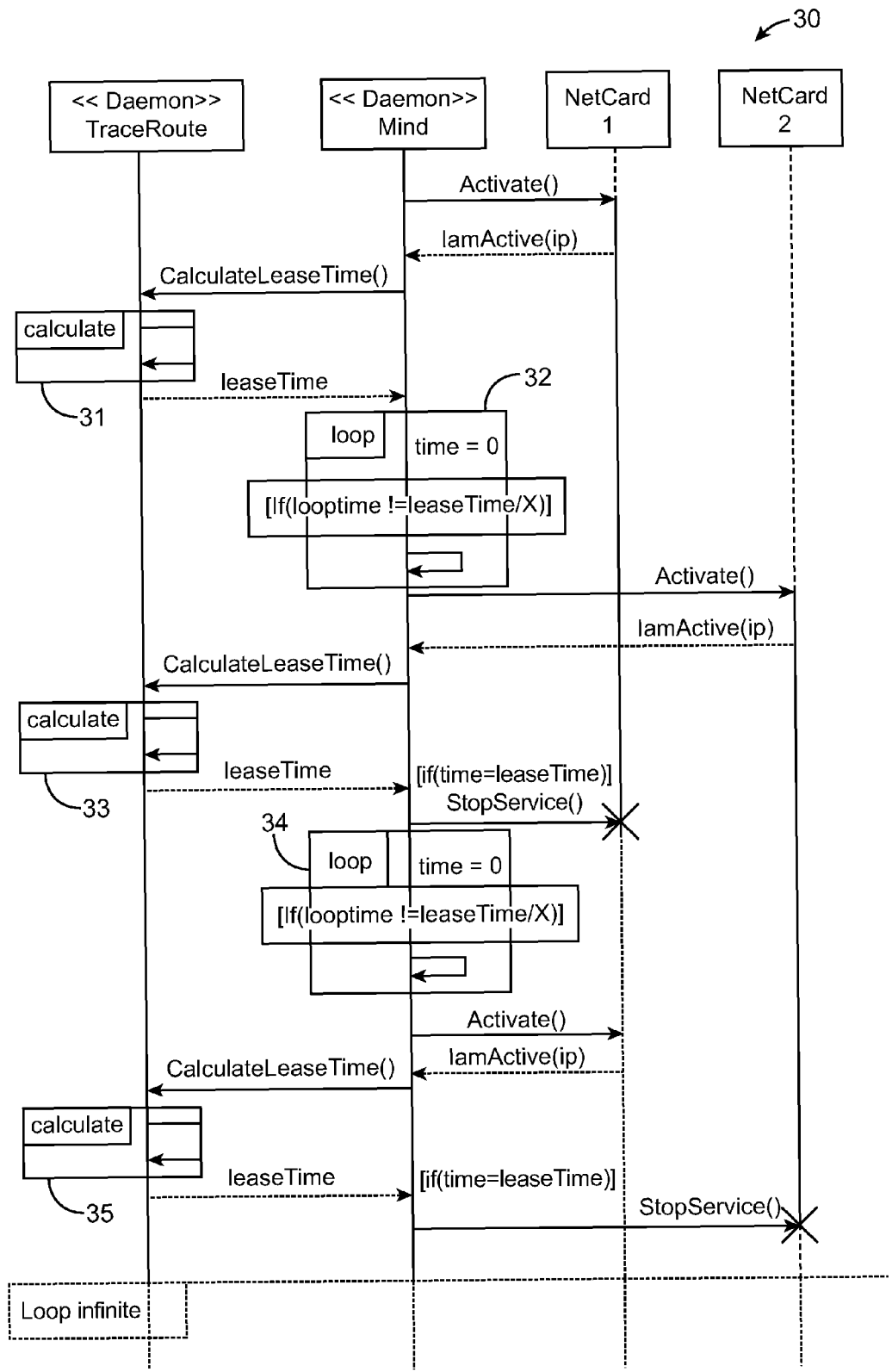
FIG. 3 shows a process for automatic network connection establishment in case of network address renewal, according to an embodiment of the invention.

FIG. 3 shows a process 30 implemented by the daemon that manages the two network adapters 15, 16, in the computer (FIG. 1). When started, the daemon 17 (<<Daemon>>) monitors the network in order to determine if the connection via adapter is still alive and to capture the lowest connection duration. This is used in determining the next requested lease time (requested by the daemon), so that it remains lower than the measured connection duration.

As such, the daemon initially activates the first adapter 15 that receives an IP address from the network. When the elapsed connection time nears the shortest leased time T, the daemon alerts the second adapter 16 by activating it, wherein the second adapter 16 requests a new address from the server. As in a loop, the daemon continues monitoring the connection time and when the connection time nears a critical window (Tcr), the control is passed back to the first adapter 15, and so on. At any given time, the two adapters 15, 16 behave as a master and slave, being the two cards alternatively the master and the slave. The critical time is directly proportional to the reliability, wherein a=value x is determined by the user, keeping in mind that the higher the value the higher is the risk of a connection loss. On the other hand, small values of x may improve daemon activity, lowering computer performance.

In one example, the daemon logic is based on a REstructured eXtended eXecutor (REXX) script that is supported over many commonly used operating systems, and therefore, provides high portability on ever various computer systems.

In FIG. 3, the daemon activates NetCard 1 using an Activate( ) function. NetCard 1 can inform the daemon that it is active using an IamActive(ip) function. In processing block 31, the daemon calculates a leaseTime for NetCard 1 using a CalculateLeaseTime( ) function. Then, the daemon enters a loop 32 the duration of which is based on leaseTime/X.

If the network has high reliability, a user can avoid a daemon loop 32 by using a value X as almost infinite. In that case, the second network card (i.e., NetCard 2) will no longer be activated and the daemon idles. This can be useful in the case of e.g., notebook computers that are used in two different network environments, such as at home (short lease time) or at work (lease time almost infinite). By configuring the X value, a notebook computer user can prevent the daemon from switching among network cards when the user is working in the office network, and while lowering X value at the home network allows the daemon to calculate the lease time and loop among (i.e., switch between) the two network cards (i.e., NetCard 1, NetCard 2).

At the end of the daemon loop 31, the daemon activates NetCard 2 using an Activate( ) function (and deactivates NetCard 1). NetCard 2 can inform the daemon that it is active using an IamActive(ip) function. In processing block 33, the daemon calculates a new leaseTime NetCard 2 using a CalculateLeaseTime( ) function. Then the daemon enters a loop 34 the duration of which is based on the new leaseTime/X.

At the end of the daemon loop 34, the daemon activates NetCard 1 using an Activate( ) function (and deactivates NetCard 2). NetCard 1 can inform the daemon that it is active using an IamActive(ip) function. In processing block 35, the daemon calculates a new leaseTime NetCard 1 using a CalculateLeaseTime( ) function. And, so on. If after blocks 33 or 35, time elapsed is equal to the leaseTime for the activated card, the StopService( ) function ends the daemon service.

The embodiment described herein is DHCP lease time independent. The daemon calculates (statistically, by choosing the minor lease time available since it started monitoring the network), a minimum lease time for a common DHCP environment and requests for a new network address (via a second network adapter) before the calculated minimum lease time of a network address obtained by a first network adapter network expires. As such, embodiments of the invention are independent from the DHCP client and need not communicate the lease time with the server when a new address is needed.

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof; however, other versions are possible. Therefore, the spirit and scope of the appended claims should not be limited to the description of the preferred versions contained herein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for maintaining a connection in a network, comprising:
    activating a first network hardware interface for obtaining a first network address for communication over the network;
    monitoring the network and determining a first lease time for the first network address;
    activating a second network hardware interface for obtaining a second network address for communication over the network upon approaching end of the first lease time; and
    deactivating the first network hardware interface, wherein communication is maintained over the network via the second network address, and wherein the first network hardware interface and the second network hardware interface switch roles of master and slave based upon activation and deactivation states.

2. The method of claim 1 wherein a deactivated network hardware interface has a slave role and an activated network hardware interface has a master role.

3. The method of claim 2 wherein determining a lease time for said first network address further includes statistically computing the lease time for the first network address.

4. The method of claim 3 further including:
    monitoring the network and determining a second lease time for said second network address;
    upon approaching end of the second lease time for said second network address, activating the first network interface for obtaining another network address for communication over the network; and
    deactivating the second network interface.

5. The method of claim 4 wherein each network address comprises an internet protocol (IP) address, and obtaining each network address includes obtaining an IP address from a Dynamic Host Configuration Protocol (DHCP) server in the network.

6. The method of claim 5 wherein obtaining a second network address further includes activating the second network interface adapter to acquire a second IP address via a DHCPREQUEST.

7. The method of claim 6 wherein:
    determining a first lease time for the first IP address includes statistically determining a minimum lease time for the common DHCP environment; and
    activating the second network interface for obtaining a second IP address includes acquiring a second IP address via a DHCPREQUEST before expiry the calculated minimum lease time.

8. A system for maintaining a connection in a network, comprising:
    a first communication node comprising a first network hardware interface and a second network hardware interface, configured for communication with another communication node on the network; and
    a managing module configured for:
        activating the first network hardware interface for obtaining a first network address for communication over the network;
        monitoring the network and determining a first lease time for the first network address;
        activating the second network hardware interface for obtaining a second network address for communication over the network upon approaching end of the lease time, thereby maintaining communication over the network via the second network address; and
        deactivating the first network hardware interface, wherein the first network hardware interface and the second network hardware interface switch roles of master and slave based upon activation and deactivation states.

9. The system of claim 8 wherein a deactivated network hardware interface has a slave role and an activated network hardware interface has a master role.

10. The system of claim 9 wherein the managing module is further configured for determining a lease time for said first network address by statistically computing the lease time for the first network address.

11. The system of claim 10 wherein the managing module is further configured for:
    monitoring the network and determining a second lease time for said second network address;
    upon approaching end of the second lease time for said second network address, activating the first network interface for obtaining another network address for communication over the network; and
    deactivating the second network interface.

12. The system of claim 11 wherein each network address comprises an internet protocol (IP) address, and the managing module is configured for obtaining each network address includes obtaining an IP address from a Dynamic Host Configuration Protocol (DHCP) server in the network.

13. The system of claim 12 wherein the managing module is further configured for obtaining a second network address by activating the second network interface adapter to acquire a second IP address via a DHCPREQUEST.

14. The system of claim 13 wherein the managing module is further configured for:
    determining a first lease time for the first IP address by statistically determining a minimum lease time for the common DHCP environment; and
    activating the second network interface for obtaining a second IP address by acquiring a second IP address via a DHCPREQUEST before expiry the calculated minimum lease time.

15. An apparatus for maintaining a connection in a network, comprising:
    a managing module configured for managing a first network hardware interface and a second network hardware interface in a first communication node for communication with another communication node on the network;
    the managing module comprising:
        a controlling module configured for activating the first network hardware interface for obtaining a first network address for communication over the network; and
        a monitoring module configured for monitoring the network and determining a first lease time for the first network address;
        wherein the controlling module is further configured for activating the second network hardware interface for obtaining a second network address for communication over the network upon approaching end of the lease time, thereby maintaining communication over the network via the second network address, and for deactivating the first network hardware interface, wherein the first network hardware interface and the second network hardware interface switch roles of master and slave based upon activation and deactivation states.

16. The apparatus of claim 15 wherein a deactivated network hardware interface acts as a slave and an activated network hardware interface acts as a master.

17. The apparatus of claim 16 wherein the controlling module is further configured for determining a lease time for said first network address by statistically computing the lease time for the first network address.

18. The apparatus of claim 17 wherein:
the monitoring module is further configured for monitoring the network and the controlling module is further configured for determining a second lease time for said second network address and upon approaching end of the second lease time for said second network address, activating the first network interface for obtaining another network address for communication over the network, and deactivating the second network interface.

19. The apparatus of claim 18 wherein:
each network address comprises an internet protocol (IP) address;
each network interface is configured for obtaining each network address by obtaining an IP address from a Dynamic Host Configuration Protocol (DHCP) server in the network; and
the controlling module is further configured for obtaining a second network address by activating the second network interface adapter to acquire a second IP address via a DHCPREQUEST.

20. The apparatus of claim 19 wherein the controlling module is further configured for:
determining a first lease time for the first IP address by statistically determining a minimum lease time for the common DHCP environment; and
activating the second network interface for obtaining a second IP address by acquiring a second IP address via a DHCPREQUEST before expiry the calculated minimum lease time.

* * * * *